June 26, 1956 R. A. SANDBERG 2,751,793
STRAIGHT PULL BRAKE LEVER STRUCTURE AND CABLE PULLEY
Filed Sept. 18, 1951 2 Sheets-Sheet 1
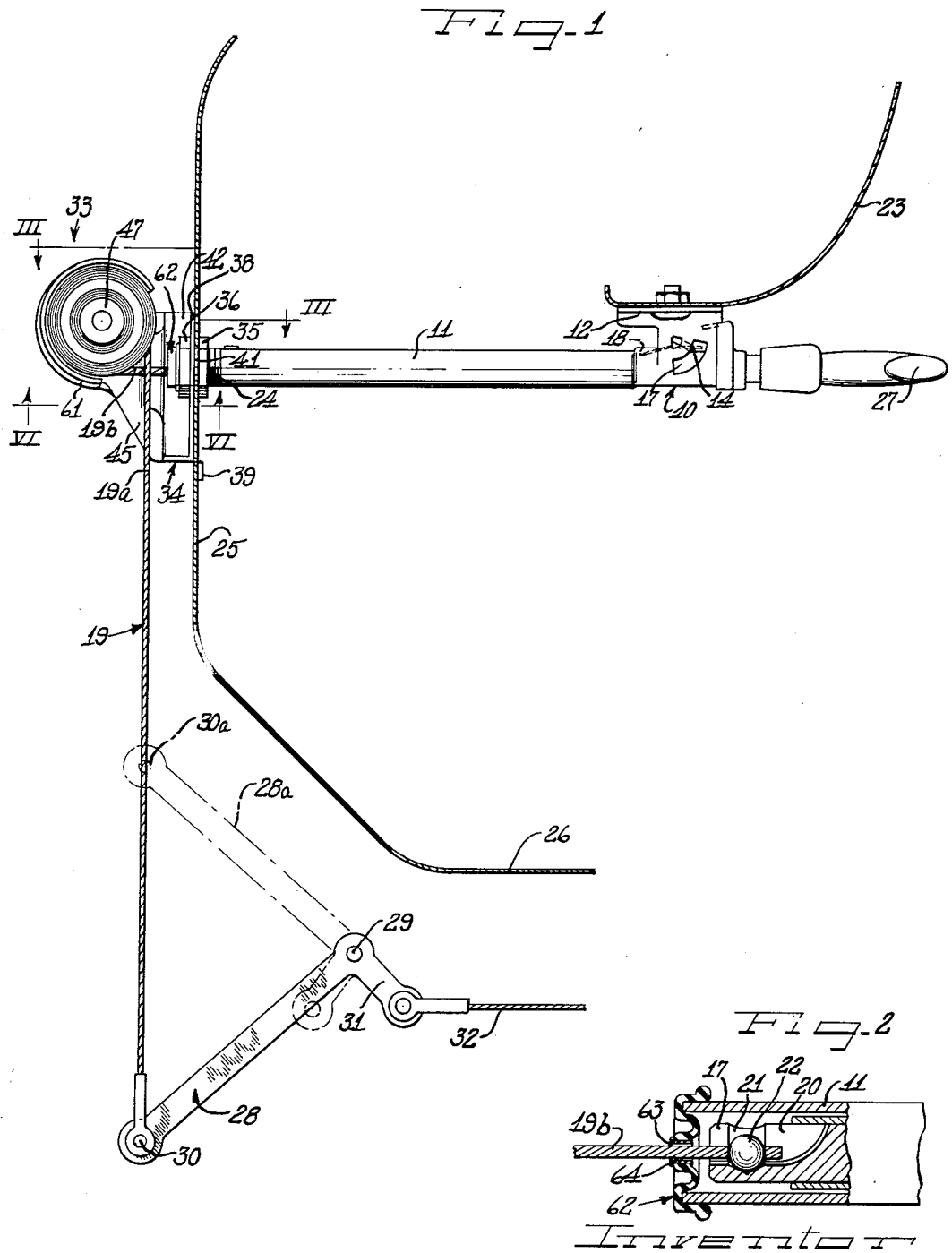
Inventor
Ray A. Sandberg June 26, 1956 R. A. SANDBERG 2,751,793
STRAIGHT PULL BRAKE LEVER STRUCTURE AND CABLE PULLEY
Filed Sept. 18, 1951 2 Sheets-Sheet 2
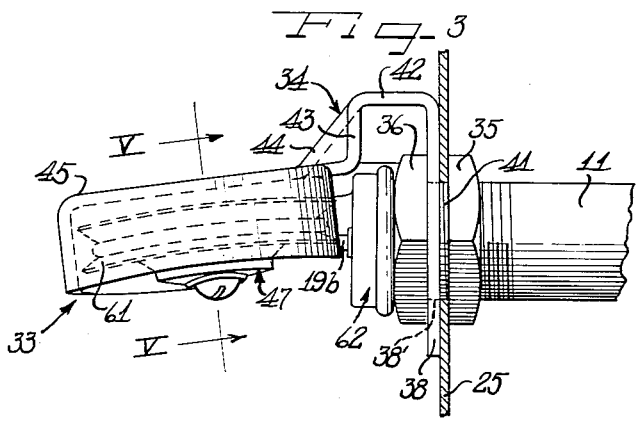
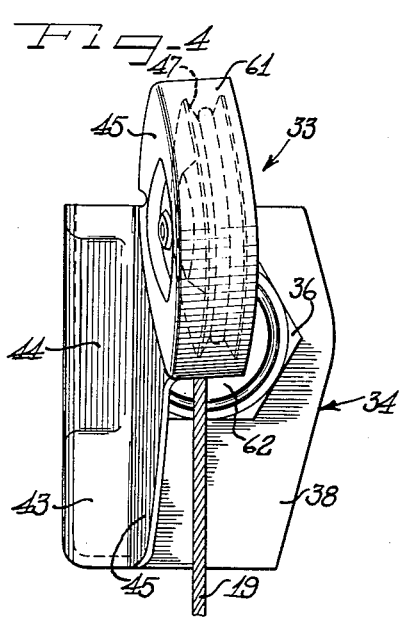
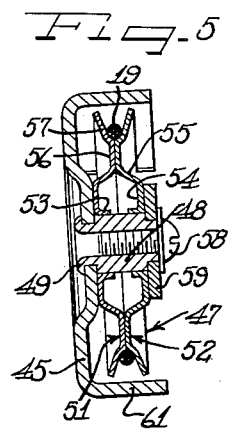
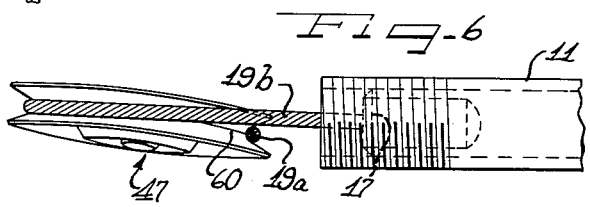
Ray A. Sandberg

United States Patent Office 2,751,793
Patented June 26, 1956

2,751,793
STRAIGHT PULL BRAKE LEVER STRUCTURE AND CABLE PULLEY

Ray A. Sandberg, Waukegan, Ill., assignor to Houdaille Industries, Inc., a corporation of Michigan Application September 18, 1951, Serial No. 247,131

9 Claims. (Cl. 74—502)

This invention relates to a straight pull brake lever construction and more particularly to improvements therein including a novel pulley structure for accommodating close-quarter angling of the brake actuating cable.

The tendency in the manufacture of automotive vehicles at the present time is to enlarge the interior passenger space of the vehicle at the expense of the engine compartment. Heretofore in a straight pull brake lever structure, a flexible cable has been utilized in transmitting the brake actuating movement of a hand brake in the passenger compartment to the brake actuating mechanism located exteriorly to the passenger compartment and generally at various positions in the front portion of the vehicle. In many of the modern vehicles, it has been necessary to bend the flexible cable rather sharply to avoid other parts of the vehicle which must be more closely arranged to accommodate the larger interior space. As the result of this sharper bending of the flexible cable, increasing friction between the cable sheath and the actuating means therein had made the application of the parking brakes unnecessarily difficult in comparison with the amount of force necessary to actuate the brake mechanism itself.

It is therefore an object of the present invention to provide a straight pull brake lever construction which is substantially frictionless while accommodating close-quarter angling of a brake actuating cable.

Another object of the invention is to provide a change-direction means which can be mounted entirely on the outside of a wall and yet is adapted to guide a cable extending through the wall in closely space relation to the wall.

A further object of the present invention is to provide a novel pulley assembly for mounting on the exterior of a wall through which a cable extends to reach the pulley.

Still another object of the present invention is to provide a novel cable-angling pulley structure adapted for use with a straight pull brake lever structure of a vehicle.

Yet another object of the present invention is to provide a pulley assembly having a cable extending around the pulley so that the leaving cable portion crosses the entering cable portion and yet wherein the entering and leaving cable portions do not engage.

Other objects, features and advantages of the present invention will be apparent from the following detailed description of a preferred exemplary embodiment thereof as shown in the accompanying drawings, in which:

Figure 1 is a vertical sectional, more or less schematic view of a straight pull brake lever assembly according to the present invention;

Figure 2 is an enlarged simplified, fragmentary longitudinal sectional view of the front end portion of the support and guide tube and actuating rod structure of the assembly;

Figure 3 is an enlarged fragmentary top plan and sectional view taken substantially along the irregular line III—III of Fig. 1;

Figure 4 is an enlarged front elevational view looking toward the pulley structure shown in Fig. 1;

Figure 5 is a cross sectional view of the pulley assembly taken substantially along the line V—V of Fig 3;

Figure 6 is a more or less schematic, fragmentary bottom plan view of the pulley and the actuating assembly illustrating the cocked relation of the pulley relative to the actuating assembly.

In Figure 1 is illustrated a straight pull brake lever assembly 10 adapted for actuating the parking brake of a vehicle such as an automobile or a truck. The brake lever assembly 10 includes a support and guide tube or housing 11 having at its rear end portion a pair of upstanding parallel legs or flanges 12 which operatively support pawl means such as a pawl 14. The pawl 14 has a wedge-like free end portion which is adapted to engage successively a plurality of ratchet teeth formed in series relation longitudinally along a brake actuating pull rod 17 which is movably disposed in the supporting and guiding tube 11. The pawl 14 is resiliently urged downwardly to engage the ratchet teeth by means of a wire biasing spring 18.

In order to attach the pull rod 17 to a brake operating means, a cable 19 is provided. The forward end portion of the rod may be longitudinally slotted as indicated at 20 (Figure 2) and provided with a transverse socket 21 intersecting the slot to receive an anchoring ball 22 affixed to the rear end of the cable 19.

The supporting and guiding tube 11 is attached at its rear end to a portion of the vehicle such as the instrument panel 23 by means of the flanges 12. The forward ends of the support 11 may be threaded as indicated at 24 for attachment to the dash panel or fire wall 25 of the vehicle which may merge with a floor panel 26 of the passenger compartment. A handle 27 is provided at the rear end of the rod 17 for retracting the cable longitudinally within the support tube 11.

A portion of the brake actuating mechanism below the floor of the vehicle is indicated herein as comprising a bell crank 28 suitably pivotally mounted at 29 and with the distal end portion of its long arm pivotally connected to the actuating cable 19 as indicated at 30. The shorter arm 31 of the bell crank is pivotally connected at its distal end portion to a further brake actuating cable 32. To set the brakes, therefore, the handle is pulled straight rearwardly to retract the cable and thus to pivot the long arm of the bell crank lever 28 upwardly to a position such as shown in dot-dash outline at 28a in Figure 1. The pawl 14 is selectively engaged with one of the ratchet teeth on the pull rod 17 to retain the bell crank 28 in the desired position. To release the brakes, the handle is turned on the axis of the rod to disengage the pawl 14 from the ratchet teeth. The brake tension then returns the bell crank 28 to the position shown in solid outline in Figure 1 and the pull rod 17 to brake release position, shown in Figures 1 and 2. In order to enable angling the cable 19 from the forward end of the guide tube 11 toward the lever 28 and close to the fire wall 25, a novel pulley assembly 33 is provided.

Referring more particularly to Figures 3–6, wherein the novel pulley structure is shown in detail, a pulley bracket 34 is carried by the threaded end of the housing 11 on the exterior of the fire wall 25. A pair of nuts 35, 36 clamp the threaded end of the housing and the pulley bracket 34 to the fire wall 25. The bracket base 38 is illustrated as having a circular opening 38' receiving therethrough the housing 11 and a rearwardly spaced downwardly depending finger 39, Figure 1, at the lower margin thereof for projecting through an opening in the fire wall and extending downwardly against the inner rear side of the wall 25. The finger 39, of course, is so constructed as to substantially close the opening in mounted position. It will be understood that this finger 39 prevents rotation of the bracket on the tube 11. In mounting, the bracket may be assembled with the housing 11 by inserting the finger 39 through the opening in the fire wall and pivoting the bracket into place against the exterior of the fire wall.

It will be understood that the opening in the fire wall for the finger 39 can be at any angle relative to the housing 11 and that the base 38 may be turned at any angle around the housing 11 by means of circular opening 38' so that the pulley bracket may be mounted in any angular relation about the tube axis desired, depending upon the position of the brake actuating mechanism such as the bell crank 28.

The bracket 34 also includes a forwardly extending body portion 42 extending outwardly generally perpendicularly from the base 38 and a reversely extending body portion 43 extending generally in parallel overlying relation to the base 38. The reversely extending body portion 43 is provided with an outwardly protruding reinforcing rib 44 therein which merges integrally with an outwardly extending pulley mounted plate or panel 45 which extends generally obliquely outwardly and upwardly from the inner margin of the reversely extending body portion 43. The outer portion of the pulley mounting plate is generally circular and of a diameter to accommodate the pulley to be mounted thereon. A pulley 47 is rotatively mounted on the mounting plate 45.

The pulley 47 is mounted by an internally threaded tubular hub 48 which is fixed to the mounting plate by an out-turned annular lip 49 and an opposed shoulder of the hub. A pair of pulley members 51, 52 are welded together to form the pulley 47 and include radially inner inturned annular flanges 53 bearing on said hub 48, radially outwardly extending bearing portion 54, converging portion 55, radially outwardly extending body portions 56 and outwardly flaring flanges 57 defining the groove of the pulley. A screw 58 threaded into said hub and a bearing member 59 seated against a shoulder formed on the end of the hub retain the pulley members on the hub.

The brake actuating cable is reversely trained over the pulley so that the leaving cable portion 19a extends close to the fire wall 25. As best seen in Figure 6, in order to receive the brake actuating cable around more than 180° of the pulley periphery without having the leaving cable portion 19a engaging the entering cable portion 19b, the pulley is cocked relative to the cable. In order to provide a substantially frictionless change of direction for the cable, the entering cable preferably enters the pulley groove substantially straight and does not bend about the outer peripheral edges of flanges 57 of the pulley groove, and the same is true of the leaving cable portion 19a. If either the entering or leaving cable portions is to be parallel to the center line 60 of the pulley groove, it will be understood that the other cable portion must form an angle with the center line to avoid contact between the entering and leaving cable portions. Of course, both the entering and leaving cable portions could be at an angle to the center line of the pulley groove just so the entering and leaving cable portions do not contact where they cross.

It will be understood that the pulley can be cocked about either a horizontal diameter, or about a vertical diameter or a combination of the two.

In the embodiment illustrated the actuating movement, for example of the cable end ball 22 defines a line which lies in a vertical plane which may be called the actuating plane of movement. The line of actuated movement of the bell crank pivot 30 from the solid position to the dot-dash position 30a in Figure 1 defines a curve line which lies in a vertical plane which may be called the actuated plane of movement. In the present instance, there is a common intermediate plane to which both the actuating and actuated lines are parallel and which is between the actuating and actuated planes. In the present instance, the pulley 47 is cocked relative to the substantially parallel actuating and actuated planes and the intermediate common plane and is disposed generally in the region of crossing of the actuating and actuated lines extended. However, if the bell crank 28 were substantially horizontally spaced from the rod 11, the leaving cable 19a would tend to extend at an angle to a vertical actuating plane through the axis of the support 11 and could be displaced sufficiently so as not to contact the entering cable 19b with the pulley vertical and parallel to the axis of the housing 11.

By way of example and not by way of limitation, in the embodiment illustrated, assuming the tube 11 is horizontal, a horizontal diameter of the pulley forms a horizontal angle of 7° with the axis of the support tube 11 and a vertical diameter forms an angle of 4° relative to the vertical direction.

To maintain the cable around the pulley in the groove thereof, a right angle pulley cover flange 61 extends in covering relation to the pulley from the circular margin of the pulley mounting plate 45.

In order to prevent fumes or the like from the engine from the entering the passenger compartment of the vehicle through the open end of the support tube 11, a yieldable cover, cap or seal 62 of rubber or rubber-like material may be applied to the end of the tube as shown in Figures 2 and 3 for closing the tube around the entering cable 19b. A cable passage opening 63 through cap 62 is provided with a metallic grommet 64 protectively mounted on the edge of the aperture to allow the entering cable to move therethrough, without wearing the cap. As shown in Figure 3, the seal 62 is mounted just forwardly of the nut 36 on the support housing 11.

It will thus be observed that the pulley is mounted on the fire wall 25 without leaving any openings through the fire wall for entrance of fumes into the passenger compartment and that the leaving cable 19a may be spaced from the wall 25 less than the diameter of the pulley employed, as shown.

It will be understood that modifications and variations may be effected without departing from the scope of the novel concepts of the present invention.

I claim as my invention:

1. A straight pull brake lever structure for actuating the brakes of a vehicle comprising a tubular support having an end extending through and attached to a wall of the vehicle, an actuating assembly movably mounted in said tubular support on the inner side of the wall, an actuating cable connected to said actuating assembly and extending in said tubular support through said wall to the outer side thereof, a pulley bracket comprising a base mounted on said end of the support on the outer side of said wall having an opening through which the support end extends, an outwardly extending body portion extending substantially at right angles from said base and spaced from said support end, a reversely extending body portion extending generally parallel to said base and toward said tube support end and a pulley mounting plate extending obliquely outwardly from said reversely extending body portion and having a generally circular outer margin with a substantially right angle pulley cover flange thereon, and a pulley mounted on said mounting plate and lying in closely spaced relation to said cover flange for receiving said cable trained reversely over the pulley to pass the entering portion of the cable and generally along said wall, said pulley extending substantially parallel to said obliquely extending mounting plate to offset the entering and departing cable portions so that the cable will not contact itself.

2. A straight pull brake lever structure for actuating the brakes of a vehicle comprising a tubular support having an end extending through a wall of the vehicle, an actuating assembly slidably mounted in said support, an actuating cable extending through said end of said support and connected to said actuating assembly in said support, a pulley bracket mounted on the outer side of said wall adjacent said support end extending through said wall and including a pulley mounting plate extending obliquely to the axis of said tubular support, and a pulley mounted by said plate and extending substantially parallel thereto for receiving said cable around more than 180° of the periphery thereof from a direction substantially axial of said support to a direction generally along said wall and closely spaced therefrom, the oblique mounting of the pulley serving to displace the entering cable from the departing cable so that the cable does not contact itself.

3. A straight pull brake lever structure for actuating the brakes of a vehicle comprising a tubular support having an end extending through a wall of the vehicle, an actuating assembly movably mounted by said support and having means for connecting with an actuating cable extending through said end of said support, a pulley mounted on the outer side of said wall adjacent said support end extending through said wall and extending obliquely to the axis of said support for receiving said cable around more than 180° of the periphery thereof from a direction substantially axial of said support to a direction generally along said wall and closely spaced therefrom, the oblique mounting of the pulley serving to displace the entering cable from the departing cable so that the cable does not contact itself.

4. A structure for actuating the brakes of a vehicle, comprising a support having an apertured end extending through a wall of the vehicle to the outer side of the wall, means carried by said support for receiving an actuating cable extending through the apertured end of said support and for actuating movement relative to said support, a pulley mounted on the outer side of said wall adjacent the apertured end of said support for receiving said cable around more than 180° of the periphery thereof to a direction generally along said wall and closely spaced therefrom, said pulley being cocked relative to said cable to prevent contact between the cable entering the pulley and the cable departing from the pulley.

5. In combination an actuating member for movement along an actuating line, an actuated member for actuation by said actuating member and for movement along an actuated line, the lines of movement of said actuating and actuated members generally defining a common plane, a cable connecting said actuating and actuated members, a pulley mounted generally at the region of intersection of the lines of the movement of the actuating and actuated members extended for receiving the entering cable from the actuating member and directing it to extend substantially toward the actuated member, said cable forming a loop at the pulley with the portion of the cable entering said pulley from the actuating member crossing in close but spaced relation to the portion of the cable leaving said pulley and connecting to the actuated member, said pulley being cocked relative to said common plane to displace the entering cable from the leaving cable where they cross so that they will not contact during actuating movement of the members.

6. A pulley assembly adapted for mounting on the outer side of the fire wall of an automotive vehicle for receiving a brake actuating cable extending through said wall to the outer side thereof and directing it along said wall, comprising an integral pulley bracket including a base for mounting on the outer side of the wall and having an opening for receiving the actuating cable therethrough, said bracket having a pulley mounting plate extending obliquely to said base and integral with said base, and means for mounting a pulley on said pulley mounting plate on an axis at right angles to said pulley mounting plate, said axis forming oblique angles with a plane parallel to said base and with a plane at right angles to said base, the last mentioned plane being so oriented that lines therein parallel to said base will extend horizontally when the bracket is mounted on the fire wall of a vehicle.

7. In combination in a straight pull brake lever construction, a pull rod having a handle at one end and means for attachment of a brake setting cable at the other end, a tubular guide structure for the rod, a bracket having a circular opening receiving the tubular guide structure adjacent said other end of the rod, and a grooved pulley rotatably mounted on said bracket and having its grooved periphery disposed to receive thereon a cable attached to said rod for anti-friction deflection of the cable into angular operative relation to the axis of the rod, said bracket being adapted to be pivoted on said tubular guide structure to any preselected angle to the axis of the rod by means of said circular opening, and means fixing said bracket on said guide structure at the preselected angle.

8. A straight pull brake lever structure for actuating the brakes of a vehicle comprising a tubular support having an end extending through a wall of a vehicle, an actuating assembly movably mounted in said tubular support on the inner side of the wall, means for connecting said actuating assembly to a cable extending through said wall within said tubular support, a pulley bracket mounted on the outer side of said wall, and a grooved pulley rotatably mounted on said bracket having its grooved periphery disposed to receive a cable attached to said assembly for anti-friction deflection into angular operative relation to the axis movement of said actuating assembly, the axis of said pulley extending at oblique horizontal and vertical angles to the axis of movement of said actuating assembly to displace the entering cable from the leaving cable where they cross without substantialy frictional contact of the cable with the side walls of the pulley groove.

9. In a straight pull brake lever structure for actuating the brakes of a vehicle comprising an actuating assembly for disposition on one side of a wall of the vehicle and having means for connecting with an actuating cable extending through the wall, and support means for said actuating assembly, a pulley for mounting on the opposite side of said wall from said actuating assembly and extending obliquely for receiving said cable around more than 180° of the periphery thereof from a direction substantially along the axis of movement of said actuating assembly and for discharging the cable in a direction generally along said wall, the oblique mounting of the pulley serving to displace the entering portion of the cable from the departing cable portion to prevent contact between said cable portions.

References Cited in the file of this patent

UNITED STATES PATENTS

| 146,391 | Hussey | Jan. 13, 1874 |
| 268,763 | Woodward | Dec. 5, 1882 |
| 1,175,602 | Chidley | Mar. 14, 1916 |
| 1,203,956 | Albanese | Nov. 7, 1916 |
| 1,339,660 | Middlebrooks | Mar. 11, 1920 |
| 1,351,469 | Coleman | Aug. 31, 1920 |
| 1,387,273 | Kendrick | Aug. 9, 1921 |
| 1,509,120 | Willoughby | Sept. 23, 1924 |
| 1,607,600 | Bachle | Nov. 23, 1926 |
| 1,713,842 | Link | May 21, 1929 |
| 1,800,578 | Webb | Apr. 14, 1931 |
| 1,952,876 | Lucey | Mar. 27, 1934 |
| 1,963,640 | Duffy | June 19, 1934 |
| 1,996,249 | McCann | Apr. 2, 1935 |
| 2,190,087 | Snell | Feb. 13, 1940 |
| 2,218,854 | Rabelos | Oct. 22, 1940 |
| 2,269,854 | Kuyper | Jan. 13, 1942 |
| 2,287,704 | Oberg | June 23, 1942 |
| 2,303,586 | Snell | Dec. 1, 1942 |
| 2,385,941 | Reynolds | Oct. 2, 1945 |
| 2,543,509 | Sandberg | Feb. 27, 1951 |
| 2,555,811 | Peterson | June 5, 1951 |
| 2,633,757 | New et al. | Apr. 7, 1953 |

FOREIGN PATENTS

| 29,470 | Great Britain | Dec. 22, 1913 |
| 335,382 | Great Britain | Sept. 25, 1930 |
| 516,309 | Great Britain | Dec. 29, 1939 |